United States Patent
Ylimartimo

(10) Patent No.: US 9,363,194 B2
(45) Date of Patent: Jun. 7, 2016

(54) DEVICE ARRANGEMENT FOR IMPLEMENTING REMOTE CONTROL OF PROPERTIES

(75) Inventor: Veikko Ylimartimo, Oulu (FI)

(73) Assignee: TOSIBOX OY (FI)

( * ) Notice: Subject to any disclaimer, the term of this patent is extended or adjusted under 35 U.S.C. 154(b) by 298 days.

(21) Appl. No.: 14/119,753

(22) PCT Filed: May 22, 2012

(86) PCT No.: PCT/FI2012/050484
§ 371 (c)(1),
(2), (4) Date: Jan. 13, 2014

(87) PCT Pub. No.: WO2012/160257
PCT Pub. Date: Nov. 29, 2012

(65) Prior Publication Data
US 2014/0129713 A1    May 8, 2014

(30) Foreign Application Priority Data
May 24, 2011 (FI) ..................... 20115512

(51) Int. Cl.
*G06F 15/16* (2006.01)
*H04L 12/911* (2013.01)
*H04L 12/28* (2006.01)
*H04L 12/46* (2006.01)

(52) U.S. Cl.
CPC ............ *H04L 47/70* (2013.01); *H04L 12/2818* (2013.01); *H04L 12/4633* (2013.01)

(58) Field of Classification Search
CPC ................................. H04L 12/2807–12/2838
See application file for complete search history.

(56) References Cited

U.S. PATENT DOCUMENTS

| 6,886,095 B1 | 4/2005 | Hind et al. |
| 7,391,298 B1 | 6/2008 | Campbell et al. |
| 7,590,074 B1 | 9/2009 | Dondeti et al. |
| 8,831,020 B2 * | 9/2014 | Ylimartimo ........ H04L 12/2818 370/254 |

(Continued)

FOREIGN PATENT DOCUMENTS

| CN | 101931561 A | 12/2010 |
| EP | 1912413 A1 | 4/2008 |
| JP | 2002354556 A | 12/2002 |
| JP | 2010086175 A | 4/2010 |

OTHER PUBLICATIONS

Search Report from National Board of Patents and Registration of Finland for priority Application No. FI 20115512, Mar. 19, 2012, 1 pp.

(Continued)

*Primary Examiner* — Brendan Higa
(74) *Attorney, Agent, or Firm* — Volpe and Koenig, P.C.

(57) ABSTRACT

In a remote control method and remote control system, a virtual private network (55) is established between a home control network key (42b, 41c) and a home control network device (61). In order to create the virtual private network both the home control network key and the home control network device determine their network paths to the Internet (2) from the data transfer network (3, 5) to which they are connected. The determined network paths are stored in a home control network server (21) on the Internet (2). When it is desired to form a virtual private network, the home control network server (21) supplies the stored network paths to the home control network key (42b, 41c) and the home control network device (61).

9 Claims, 5 Drawing Sheets

(56) References Cited

U.S. PATENT DOCUMENTS

| | | |
|---|---|---|
| 2003/0214955 A1 | 11/2003 | Kim |
| 2004/0037260 A1* | 2/2004 | Kakemizu ............ H04L 12/4641 370/338 |
| 2005/0120204 A1 | 6/2005 | Kiwimagi et al. |
| 2007/0218912 A1* | 9/2007 | Song ................... H04L 63/0272 455/445 |
| 2009/0066789 A1 | 3/2009 | Baum et al. |
| 2009/0319673 A1 | 12/2009 | Peters |
| 2010/0014529 A1* | 1/2010 | Takechi ............ H04L 29/12509 370/401 |
| 2010/0125894 A1 | 5/2010 | Yasrebi et al. |

OTHER PUBLICATIONS

International Search Report, International Application No. PCT/FI2012/050484, Dec. 18, 2012, 6 pp.

Office Action mailed in Chinese Patent Application No. 201280025225.1 on Apr. 21, 2015, consisting of 13 pp. (English Translation Provided).

Supplemental European Search Report mailed in European Patent Application No. 12788813.9 on Mar. 17, 2015, consisting of 8 pp.

Office Action mailed in Mexican Patent Application No. MX/a/2013/013745 on Apr. 14, 2015, consisting of 4 pp.

* cited by examiner

DEVICE ARRANGEMENT FOR IMPLEMENTING REMOTE CONTROL OF PROPERTIES

FIELD OF INVENTION

The invention relates to a remote control method of actuators in a property and a remote control system with its components.

BACKGROUND

Remote-controllable devices and systems are increasingly being installed in properties and homes. The purpose of the systems is to secure and/or maintain such conditions in properties, so that living in them is both safe and pleasant. The spectrum of remote-controlled on remote-monitored devices is wide. The same property may have devices from several suppliers. These devices can often not communicate directly with one another. It is also common that each system has its operation logic, the remote controlling of which requires the use of a particular data communications solution.

Building service suppliers have lately started to solve the problem very generally by ordering from an operator for the customer target its own, separately costing additional connection, which contains certain target-specific agreed-on features and must be separately maintained, either via a telephone network or a broadband network, which broadband network can be a permanent of wireless 2G/3G network broadband connection. Most suppliers have found this to be the easiest mode of operation for them at the moment, even though it contains several problem points.

If a new additional connection is provided for the target, data communications matters must often be agreed upon separately with an administrator of the local intranet. The intranet administrator probably has to make additional network configurations for the connection, so that establishing a remote connection can succeed.

Often one must wait for an additional connection, especially a permanent network connection, for a long time, even many weeks. When the connection is finally received, it often does not work in the way agreed upon when ordering it from the operator, and one must negotiate about repair procedures and wait for the operator to act in the matter.

Operators still promise too much, when talking about the operation of wireless broadband connections. When the remote target is connected to the new wireless connection and it does not work correctly, prolonged and time-consuming, costly and on all parts draining negotiations are mostly ahead.

Additionally operators strive to commit customers to being connection users by lumping together the connection, a modem and for example a 24-month mandatory use time. Not all users however are willing to participate in this, but often want to "hold the reigns themselves".

One can try to solve remote use of the target also with an application-specific solution. Thus the device supplier can buy from the operator its own radio network and form in it a private access point name (APN), which determines data communications settings in GPRS (General Packet Radio Service) and HSDPA (High Speed Downlink Packet Access)/HSUPA (High Speed Uplink Packet Access) networks. By using APN settings, and Internet connection is provided via a wireless 2G/3G/4G network to the devices in the target. In such cases the user must pay separately for the connection and for the interface modems and programs enabling its remote use. Often such an additional connection cannot or may not be used for more than one use purpose, for example for the remote use of devices supplied by the building service supplier. Additionally operators nowadays generally limit the maximum amount of data transfer in such connections, which when exceeded may cause large additional invoices for the connection owner.

In housing cooperative type targets, which have several properties, the properties may be connected to "remote use" occurring only within the intranet formed between the properties. No real remote contact is obtained for such targets, if the remote contact user is physically elsewhere than in one of the properties in question in the intranet.

SUMMARY

It is an object of the invention to provide a new remote control arrangement for technical devices in a property and a remote control method utilising this remote control arrangement, where the Internet connection already existing in the properties and homes are utilised as such in the remote use of the building service and surveillance. With a remote use device pair according to the invention, the target connection of the property is altered to be as such suitable for remote use. Already existing functions of the data network connection in the target and the intranet in the target are not altered.

The objects of the invention are attained with a device arrangement, in which a home control network device installed in a fixed manner in a property and a home control network key of a person realising monitoring of the property establish a secure two-way connection over the Internet based on contact information they have received from a home control network server according to the invention. The home control network device in the property, to which the devices to be remote-controlled or remote-monitored in the property are connected, are connected to a data network connection device/network terminal in the property, for example a modem.

The current IP addresses of the home control network device and the home control network key are maintained in the home control network server related to the invention, which IP addresses are used for establishing a connection between said devices. Due to the additional procedures and the connection establishing methods according to the invention both said devices can be connected to some private, non-public network, and they can still establish among themselves a data transfer connection over the Internet. Advantageously it is enough for establishing the data transfer connection over the Internet between the mobile home control network key and the fixed installed home control network device that said devices at some point in the established connection also obtain a public IP address, even though simultaneously the home control network device and the home control network key only have non-public IP addresses. The home control network server does not participate in the establishing of the actual data transfer connection after it has sent the IP addresses of the devices to be available to the devices.

An advantage with the property remote control system according to the invention is that both the devices in the home control network device pair can search their routing from their placement location to the IP address of the device of the property connecting to the Internet and to store the searched route in a separate home control network server on the Internet for the identification and IP address of the device pairs.

It is further an advantage of the invention that each home control network device pair according to the invention forms independently among themselves a predetermined unique device pair or device group, which identify each other in the network. Due to the identification method the home control network key carried with the user or a computer program installed in some data processing device, which computer program implements the functions of a home control network key, establishes a network connection only with its own unique home control network device pair, and the connection cannot be established with any other network device. Thus the home control network key functions as a strong safety key to the "network doors" of the property.

It is further an advantage of the invention that the device pair of the remote control system according to the invention can among themselves independently with the aid of the address information of the home control network server establish a direct two-way secure OSI model (Open Systems Interconnection Reference Model) data link layer (Layer 2) level or also network layer (Layer 3) level data transfer connection through the serving local network devices and the Internet (VPN; Virtual Private Network) without having the established connection circulating at all through an external server. The data link layer level secured remote transfer connection is a basic requirement for many flexible uses and utilisations of building service control devices.

It is further an advantage of the invention that the home control network device pair can be established either in connection with manufacturing or in connection with start-up occurring later. In both cases the device pair is advantageously formed by connecting the home control network device and the home control network key together for example via a USB port, whereby either or both of them receive each other's identification code.

It is further an advantage of the invention that in the remote control system according to the invention the programs of the home control network key with their security identifiers and passwords can be stored in an external server, from where they can be retrieved to a new remote control network key or a program installed into a terminal, which program simulates a home control network key, in return for the security identifiers or passwords.

The home control network key according to the invention is characterised in that it may comprise a processor, a memory and a therein stored computer program code, which are configured to receive a unique device identification code sent by its unique network terminal pair, which is an unique terminal device with which the home network control key is only allowed to establish a data transfer connection, or send its own device identification code to its unique network terminal pair, when the home control network key and the unique network terminal pair are connected together with theirs USB ports, request from the home control network server network path information of its unique network terminal pair in order to establish an end-to-end data transfer connection to its unique network terminal pair, receive from the home control network server the network path information of its unique network terminal device pair, and establish with the aid of the received network path information with its unique network terminal pair a virtual private network for the remote control of actuators of a property, to which virtual private network the home control network server does not belong.

The home control network device in a property according to the invention is characterised in that its processor, memory and therein stored computer program code are configured to receive a unique device identification code sent by its unique network terminal pair, which is an unique terminal device with which the home control network device is only allowed to establish a data transfer connection, or send its own device identification code to its unique network terminal pair, when the home control network device and the network terminal pair are connected together with theirs USB ports, request from the home control network server network path information of its unique network terminal pair in order to establish an end-to-end data transfer connection to its unique terminal pair, receive from the home control network server the network path information of its unique network terminal device pair, and establish with the aid of the received network path information with its unique network terminal pair a virtual private network for the remote control of actuators of a property, to which virtual private network the home control network server does not belong.

The computer program according to the invention, utilised in a home control network key, is characterised in that it comprises:

code means for receiving a unique device identification code sent by a unique network terminal pair, which is an unique terminal device with which the home control network key is only allowed to establish a data transfer connection, or for sending its own device identification code to the unique network terminal pair, when a home control network key and a home control network device pair are connected together with theirs USB ports.

code means for requesting from the home control network server the network path information of the unique network terminal pair in order to establish an end-to-end data transfer connection to the unique network terminal pair, code means for receiving the network path information of the unique network terminal pair from the home control network server, and code means for establishing a virtual private network by means of the received network path information with the unique network terminal pair for remote control of actuators in the property, to which virtual private network the home control network server does not belong.

The computer program according to the invention, utilised in a home control network device, is characterised in that it comprises:

code means for receiving a unique device identification code sent by its unique network terminal pair, which is an unique terminal device with which the home control network device is only allowed to establish a data transfer connection, or for sending its own device identification code to its unique network terminal pair, when the home control network device and the network terminal pair are connected together with theirs USB ports.

code means for requesting from the home control network server the network path information of its unique network terminal pair in order to establish an end-to-end data transfer connection to its unique terminal pair, code means for receiving the network path information of its unique network terminal pair from the home control network server, and code means for establishing a virtual private network by means of the received network path information with its unique network terminal pair for remote control of the actuators in the property, to which virtual private network the home control network server does not belong.

Some advantageous embodiments of the invention are presented in the dependent claims.

The basic idea of the invention is the following: In order to implement remote control in some property a device pair is manufactured, a home control network device and a home control network key (device), where at least one home control network device and at least one home control network key (device) can establish a data transfer connection only with each other. Said home control network key (device) may either be a separate electronic device manufactured for this purpose or it may also be some data processing device, in which a computer program according to the invention has been installed, which program implements the home control network key functions.

The home control network device in the property to be remote-controlled is installed in an existing intranet network or Internet network in the property to be controlled. It establishes one subnetwork, a control intranet network, in the intranet or Internet network, to which control intranet network various actuators to be controlled in the property are connected either with a wired or wireless data transfer connection.

In one advantageous embodiment of the invention an individual home control network key or several home control network keys can function as the device pair of two or more home control network devices in different properties. The identification codes of the home control network device and the home control network key are stored in said devices in connection with their manufacturing, or said devices change their identification codes when they are connected for example to one of their USB ports. By using the identification codes the home control network device and home control network key can establish a two-way secure data transfer connection between them. The data transfer connection can advantageously be based on an OSI model data link layer (Layer 2) or network layer (Layer 3).

In connection with start-up, both devices determine routing information of the devices from their location network all the way to a network terminal connected to the Internet, which routing information is needed for the connection establishment. This routing information is stored in a home control network server according to the invention, connected to the Internet. When the home control network key wants to establish a data transfer connection via the Internet to its device pair in some property, it retrieves the routing information of the home control network device functioning as its pair from the home control network server. By utilising the obtained routing information the home control network key begins to establish a direct end-to-end data transfer connection. When the direct data transfer connection has been established, a direct VPN data transfer connection advantageously using the network layer has been established between the home control network key and the home control network device in the property.

A home control network device according to the invention is installed in the internal data transfer network of a property to be remote-controlled between an existing internal data transfer network related to control and management of the property and a network terminal relaying traffic from the property to the Internet. All devices related to property control are connected to the inputs of the home control network device and the output of the home control network device is connected to the input meant for the intranet device of the network terminal relaying Internet traffic.

The home control network key according to the invention can be connected to some data transfer device, which is able to establish a data transfer connection to the Internet. Possible data transfer devices are for example a PC, a tablet computer or a smartphone. The connection of the home control network key to the data transfer device can be done for example with the aid of a LAN interface (Local Area Network), a WLAN interface (Wireless LAN), a WAN interface (Wide Area Network), a USB interface (Universal Serial Bus) or an antenna interface.

In one advantageous embodiment of the invention the computer program implementing the functions of the home control network key is stored on a portable data storage means, for example a USB stick, from which the computer program can be installed into a suitable data processing device. The program installed in the data processing device simulates all the functions of the home control network key.

When the home control network key is either connected to a data transfer device connected to a local network or the computer program implementing the functions of the home control network key is installed in said data transfer device, the home control network key first determines its own routing through different subnetworks to the home control network server. When the routing is ascertained, the routing information of the home control network key is stored in the home control network server according to the invention.

When a two-way end-to-end data transfer channel is formed between the home control network key and the home control network device, device pair routing information through different subnetworks stored in the home control network server is utilised for forming the data transfer channel. When the data transfer connection has been established, the data transfer takes place so that the home control network server does in no way participate in the data transfer any longer.

BRIEF DESCRIPTION OF THE DRAWINGS

In the following, the invention will be described in detail. In the description, reference is made to the enclosed drawings, in which.

DETAILED DESCRIPTION OF THE PREFERRED EMBODIMENTS

The embodiments in the following description are given as examples only, and someone skilled in the art may carry out the basic idea of the invention also in some other way than what is described in the description. Though the description may refer to a certain embodiment or embodiments in several places, this does not mean that the reference would be directed towards only one described embodiment or that the described characteristic would be usable only in one described embodiment. The individual characteristics of two or more embodiments may be combined and new embodiments of the invention may thus be provided.

Figure 1:
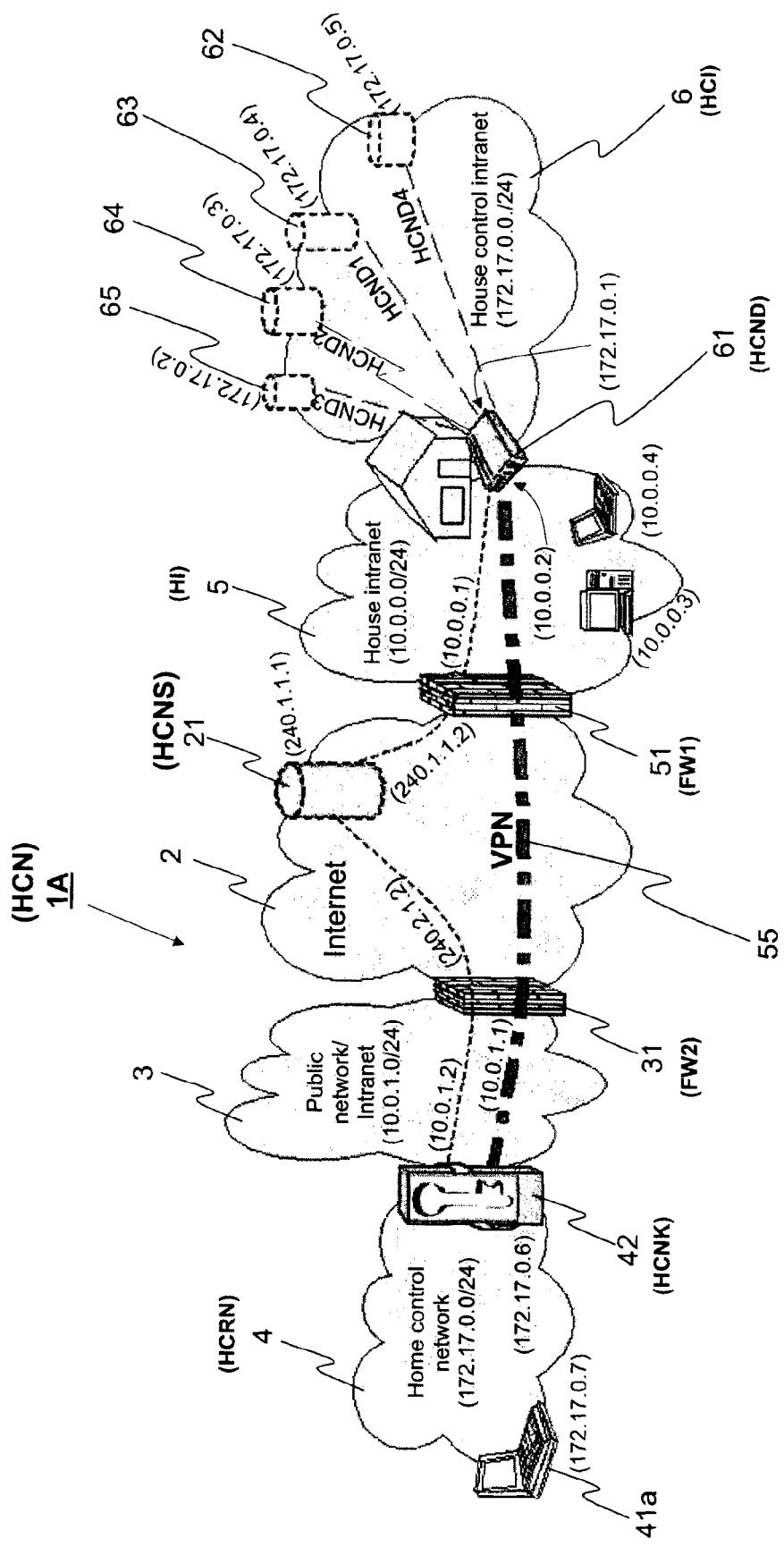
FIG. 1 shows as an example how a two-way data transfer connection according to the invention can be established between a client device handling remote control and an individual control or management device of a property.
Figure 2:
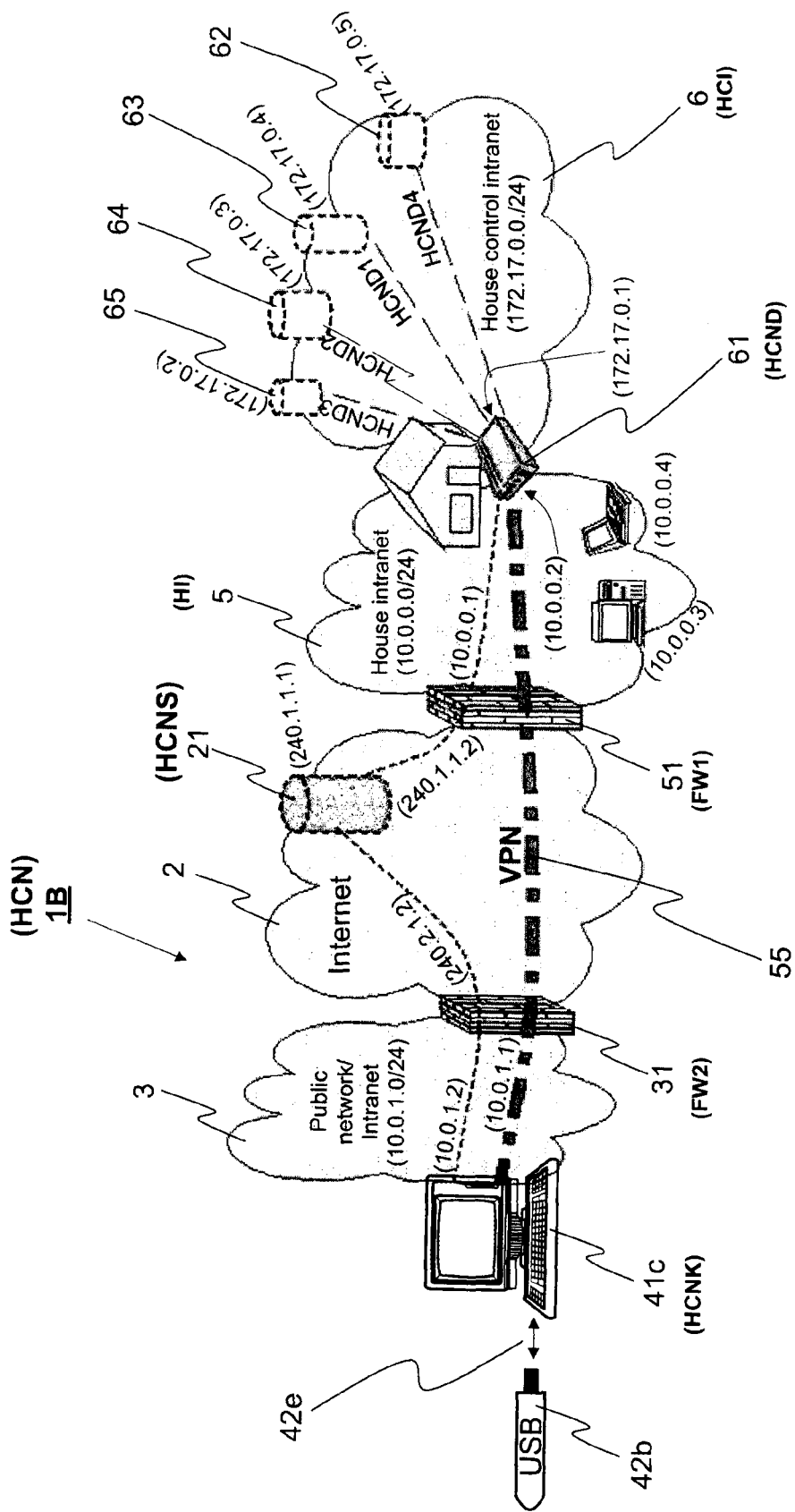
FIG. 2 shows a second example according to the invention, where a two-way data transfer connection is established between a client device handling remote control and an individual control or management device of a property.

FIGS. 1 and 2 show two advantageous embodiments 1A and 1B of the remote control system according to the invention. In the examples of FIGS. 1 and 2 one home control network key 42 or data processing device 41c, which has by software been converted into a home control network key, is used to establish a data transfer connection to one home control network device 61 in some property. The home control network key 42 or the data processing device 41c converted into a home control network key according to the invention can however advantageously also function with separate home control network devices in two or more properties.

In both embodiments of FIGS. 1 and 2 the data transfer network mainly has the same basic network structure. In both FIGS. 1 and 2 the Internet is shown with reference 2. Some public network or an intranet, reference 3, is also connected to the Internet 2. The network 3 may be a permanent or wireless data transfer network. In FIG. 1 a first data transfer network 4, the house control remote network of the property, is connected to the network 3, to which house control remote network the client device implementing the remote control, reference 41a, can be connected. In FIG. 2 the data processing device 41c simulating the home control network key is connected to a public network/intranet network 3.

The house intranet in the property to be remote-controlled is in FIGS. 1 and 2 designated with reference 5. A second data transfer network 6, a house control intranet according to the invention, is connected to the house intranet network 5. The actuators 62-65 to be remote-controlled in the property are connected to the house control intranet.

It is evident to someone skilled in the art that there may also be more subnetworks between the home control network device 61 and/or the home control network key 42 or 41c according to the invention and the Internet 2 than what is shown in FIGS. 1 and 2.

In the examples of FIGS. 1 and 2 the second network terminal according to the invention, the home control network device 61 (HCND), is connected to the house intranet network 10.0.0.0/24, reference 5. The house intranet network 5 is connected to the Internet 2 with network terminal 51. The network terminal 51 can be a router, a modem or a firewall, which can include also a network address translator NAT. In the examples of FIGS. 1 and 2 the house intranet 5 is behind a firewall FW1 containing a NAT function, reference 51. The public IP address of the firewall FW1 is in the examples of FIGS. 1 and 2 240.1.1.2. In the house intranet 5 the internal IP address of the firewall FW1 is 10.0.0.1. Two exemplary other data processing devices are also connected to the house intranet network 5, the IP addresses of which in the house intranet network are 10.0.0.3 and 10.0.0.4.

The house control intranet network 172.17.0.0/24 (HCI), reference 6, is connected to the house intranet network 5 via the home control network device 61. The IP address of the home control network device 61 in the house control intranet network is 172.17.0.1 and in the house intranet network 10.0.0.2. In the examples in FIGS. 1 and 2 four exemplary devices/servers 62, 63, 64 and 65 are connected to the house control intranet 6. The devices/servers can be connected to the house control intranet 6 either with a permanent connection or a wireless data transfer connection.

Reference 62 shows a lighting control webserver, the IP address of which in the house control intranet network is 172.17.0.5. For a remote user the lighting control webserver 62 is seen as device HCND4.

Reference 63 shows a heat control webserver, the IP address of which in the house control intranet network is 172.17.0.4. For a remote user the heat control webserver 63 is seen as device HCND1.

Reference 64 shows a surveillance camera webserver, the IP address of which in the house control intranet network is 172.17.0.3. For a remote user the surveillance camera webserver 62 is seen as device HCND2.

Reference 65 shows an air-conditioning webserver, the IP address of which in the house control intranet network is 172.17.0.2. For a remote user the air-conditioning webserver 65 is seen as device HCND3.

In the example of FIG. 1 the first network terminal according to the invention, the home control network key 42 (HCNK), is connected to the house control remote network 172.17.0.0/24, reference 4. The house control remote network 4 is behind the intranet 3 firewall FW2, reference 31. The public IP address of the NAT firewall 31 is in this example 240.2.1.2 and the internal IP address of the NAT firewall is 10.0.1.1.

The house control remote network 172.17.0.0/24 (HCRN), reference 4, is connected to the data transfer network 3 via a home control network key 42 according to the invention. The IP address of the home control network key 42 in the intranet network is 10.0.1.2 and in the house control remote network 172.17.0.6. In the examples of FIGS. 1 and 2 an exemplary data processing device 41a has been connected to the house control remote network 4, the IP address of which data processing device in the house control remote network 4 is 172.17.0.7. This data processing device 41a is used, when it is desired to remotely control devices/servers 62, 63, 64 or 65 connected to the house control intranet network 6.

The home control network key 42 and home control network device 61 according to the invention need each other's routing information, in order for them to be able to establish between them an end-to-end data transfer connection based on the data link layer or network layer, in the examples of FIGS. 1 and 2 a VPN data transfer connection 55. The routing information is stored by both the home control network key 42 and the home control network device 61 according to the invention in a home control network server 21 (HCNS) on the Internet.

In the example of FIG. 1 the NAT firewalls do not completely restrict outgoing UDP communication. They are so-called NAT firewalls in one state and "with memory", which also do not change the source port numbers of UDP connections (User Datagram Protocol) unforeseeably, if they do not have to. In the example of FIG. 1 the object is to establish in the data link layer an Ethernet level connection between the home control network key 42 and the home control network device 61.

When in the remote control system 1A according to FIG. 1 it is desired to establish a data transfer connection 55 belonging to a virtual private network (VPN) between the devices, then both devices 42 and 61 retrieve from the home control network server 21 the routing information stored therein by the counterpart device. Before surrendering the routing information, the home control network server 21 checks that it is really a question of an allowed home control network key/home control network device pair. With the aid of the retrieved routing information the home control network key 42 and the home control network device 61 establish a direct VPN connection between them. When the VPN connection 55 is completed, a data processing device 41a in the house control remote network 4 can make contact with a device 62, 63, 64 or 65 in the house control network 6.

In order for it to be possible to establish the data transfer connection, the home control network key 42 and the home control network device 61 must determine their network path from their own network at least to the Internet 2. This network path determination can be made for example in the following manners, which the home control network key 42 and home control network device 61 advantageously utilise.

With a DHCP protocol (Dynamic Host Configuration Protocol) the IP settings for the network interface of the data processing device can be retrieved. Settings obtainable with the DHCP procedure are at least the IP address of the data processing device, the network mask, the default gateway and the DNS server (Domain Name System), which transforms the domain names into IP addresses.

A Traceroute procedure is a tool which uses a TCP/IP protocol, which determines along what route or network path packets transfer to the determined machine. In the Traceroute procedure a data transfer device connected to the network ascertains the network path by adding a Time to Live value (TTL) of the packets it sends one at a time, starting from zero.

Ascertaining the network path typically occurs in the following way. The data processing device sends to a default gateway an IP packet with some target address in the external network using the TTL value "0". The default gateway responds to this with a message of TTL expired. For example the IP address, delay etc. of the default gateway become clear from this message.

Thereafter the data processing device sends to the default gateway an IP packet with some target address in the external network using the TTL value 1. Again the router following the default gateway responds with a message "TTL expired", from which the IP address of this subsequent (second) router is clear. This transmission/response process is continued by increasing the TTL value until the desired goal is reached. In the case of the Internet the final goal is typically reached with a TTL value of 6-15. The final result is that the data processing device knows the network path to the outside world, for example the Internet.

An ICMP protocol (Internet Control Message Protocol) can be utilised in ascertaining external addresses. A Record Route flag of an ICMP packet is used in the ICMP procedure, which flag requests operating systems of the devices on the network path to record in the ICMP packet's title the IP address of the transmitting router.

In the example of FIG. 1 the network route determinations are done by the home control network key 42 and the home control network device 61 with at least one of the processes described above. These devices store the discovered network paths on the home control network server 21, which stores them in its memory.

The home control network key 42 and the home control network device 61 according to the invention advantageously also have an ability to determine a free cyber space. Said devices are configured to determine for themselves an available cyber space automatically, by utilising the network path information on the home control network server 21. Said devices request the home control network server 21 to give some free part of the cyber space. The home control network server 21 examines the network paths it has received and returns some network block, where not even one address is mentioned in the network path of any device known thereby.

The home control network device 61 also advantageously offers DHCP and DNS services in its own subnetworks 4 and 6 for devices connected thereto. Additionally the home control network key 42 and the home control network device 61 function as a default gateway for devices connected to the subnetwork.

FIG. 2 shows another remote control system 1B according to the invention. In FIG. 2 the data processing device 41c utilised by the user is connected to a data transfer network depicted with reference number 3. The embodiment of FIG. 2 differs from the embodiment of FIG. 1 in that the functions of the home control network key 42 of FIG. 1 are substituted with a USB memory 42b, which can be connected to a data processing device 41c utilised by the client. In this embodiment the data processing device 41c and the USB memory 42b together form the home control network key.

In another advantageous embodiment of the invention the computer program implementing the functions of a home control network key according to the invention is installed from the USB memory 42b to the data processing device 41c. The computer program can advantageously be stored in the data processing device 41c for example from a USB stick 42b by attaching the USB stick to a USB port in the data processing device 41c. For someone skilled in the art it is obvious that some other prior art data storage means can also be used as storage means for the computer program. In this embodiment the data processing device 41c simulates a home control network key according to the invention with a computer program installed therein.

In FIG. 2 the home control network key 42 of FIG. 1 is simulated in its entirety or partly in the user's data processing device 41c. The user makes contact with this simulation software with a browser in his data processing device 41c, or alternatively the simulation software opens a browser window in the data processing device 41c. The simulation is started by launching the simulation program according to the invention in the data processing device 41c, which simulation program implements all the functions of a physical home control network key 42 by software.

In this embodiment all the functionalities of the home control network key 42 of FIG. 1, communication, start-up and connection establishment, are implemented with the user's data processing device 41c, whereby a physically separate home control network key 42 according to FIG. 1 is not needed for establishing a connection to a device pair 61 in the property.

If for some reason the establishment of such a direct VPN tunnel is not successful between the home control network key 42, 42b or 41c and the home control network device 61 presented in FIGS. 1 and 2 or it is successful only occasionally, the described remote control arrangements may utilise a home control network double key connected to the Internet 2, which assists in the establishing and maintenance of the connection. In such a remote control system the home control network double key assists in creating a VPN tunnel by bridging two VPN tunnels coming from different directions into one VPN tunnel. For the client device user the remote control system functions in the same way as in the remote control systems presented in FIG. 1 or FIG. 2.

The following is an example of the operation of the remote control system 1A according to the invention in the example of FIG. 1.

The home control network device 61:

The home control network device 61 is connected to the 10.0.0.0/24 network (the house intranet 5) for example by attaching a cable to the WAN port of the home control network device 61. The home control network device 61 automatically retrieves its IP settings with the DHCP procedure. A firewall FW1 in the house intranet network 5 advantageously functions as the DHCP server, which firewall gives the home control network device 61 the IP address 10.0.0.2 in a 24 bit network mask (255.255.255.0). The DHCP server also gives the default router address 10.0.0.1 and the DNS server address 10.0.0.1.

The home control network device 61 begins the communication by ascertaining with the aid of the DNS server the IP address of the home control network server 21 (HCNS, DNS address etahallinta.fi). The DNS server 10.0.0.1 gives the home control network server's 21 IP address as 240.1.1.1.

The home control network device 61 makes contact 240.1.1.1 with the home control network server 21 over the Internet with a TCP or UDP protocol. The home control network device 61 authenticates mutual operational rights with the home control network server 21 with certificates and/or passwords determined in connection with manufacturing. This data transfer connection is advantageously encrypted for example with an SSL/TLS encryption. The home control network server 21 sees from the incoming connection the public IP address of the home control network device 61, which in the example of FIG. 1 is 240.1.1.2. The home control network device 61 notifies the home control network server 21 of its own address and network mask (10.0.0.2/24). The home control network server 21 stores this information in its database.

The home control network device 61 advantageously also performs a traceroute operation toward the home control network server 21 and reports the discovered network path to the home control network server 21. The home control network server 21 stores the received network path of the home control network device 61 in its database.

Next the home control network device 61 advantageously also performs an ICMP Record Route operation and reports the discovered route to the home control network server 21. The home control network server 21 stores the route received from the home control network device 61 in its database.

Thereafter the home control network device 61 performs an automatic determination of free cyber space by sending an inquiry to the home control network server 21. The home control network server 21 returns to the home control network device 61 in the examples of FIGS. 1 and 2 the cyber space 172.17.0.0/24.

The home control network device 61 takes the cyber space into use for its intranet 6, and as its own IP address the home control network device 61 takes 172.17.0.1. The home control network device 61 notifies the home control network server 21 about the taking into use, which server stores the information in its database.

In FIGS. 1 and 2 the home control network device 61 is shown as its own separate device, which establishes its own subnetwork for controlling devices in a property. It is obvious to someone skilled in the art that the functions of the home control network device 61 can be integrated as a part of a computerised or house engineering device, which has a sufficient processor and memory capacity and connecting means for connecting various technical means thereto either with a wired data transfer connection or a wireless data transfer connection.

The home control network key 42:

The WAN port of the home control network key 42 is connected to the 10.0.1.0/24 network (data transfer network 3). The home control network key 42 retrieves IP address information from the DHCP server, as which a firewall FW2 functions, reference 31. The home control network key obtains the IP address 10.0.1.2. The address of the default router 31 of the home control network key 42 is 10.0.1.1 and the address of the DNS server 31 is 10.0.1.1, which are obtained from the DHCP server.

The home control network key 42 begins the communication by ascertaining with the aid of the DNS server the IP address of the home control network server 21 (HCNS, DNS address hcns.fi). In the examples of FIGS. 1 and 2 the DNS server 10.0.1.1 gives 240.1.1.1 as the IP address of the home control network server 21.

Thereafter the home control network key 42 contacts the home control network server 21 on address 240.1.1.1 over the Internet primarily with a UDP protocol, secondarily with a TCP protocol. The home control network key 42 authenticates mutual operational rights with the home control network server 21 with pre-distributed certificates and/or passwords. The data transfer connection is advantageously encrypted for example with an SSL/TLS encryption. The home control network server 21 sees from the incoming connection the public IP address 240.2.1.2 of the home control network key 42. The home control network key 42 additionally notifies the home control network server 21 of its own address and network mask 10.0.1.2/24. The home control network server 21 stores this information in its database.

Next the home control network key 42 performs a traceroute operation and reports the discovered network path to the home control network server 21, which stores the information in its database.

The home control network key 42 advantageously also performs an ICMP record route operation and reports the discovered network path to the home control network server 21, which stores the information in its database.

The home control network server 21 checks the received route information and if there are overlaps, the home control network server 21 reports them to the home control network key 42, which if necessary performs the automatic determination of free cyber space again.

A data processing device 41c as a home control network key:

In the embodiment 1B according to FIG. 2 the home control network key 42 has been replaced with a user's data processing device 41c, wherein a computer program comprising the functions of the home control network key has been stored (reference 42e) from a home control network key 42b according to the second embodiment of the home control network key. Said home control network key 42b may advantageously be a so-called USB stick. In the embodiment of FIG. 2 the above-described functions of the home control network key 42 are performed by a computer program installed into the user's data processing device 41c from a USB stick 42b.

An example of controlling an actuator using the remote control system 1A.

Some device is connected to the remote control system 1A by connecting the device to be connected to an intranet interface of the home control network device 61 either with a permanent connection or wirelessly.

For example a heat control webserver 63 (HCWS) is connected to the house control intranet network 6. In this example, after the heat control webserver 63 is connected, the heat control webserver 63 retrieves its IP settings with the DHCP service. The heat control webserver obtains from the home control network device 61 172.17.0.4 as its own address, 172.17.0.1 as the address of the default router, 172.17.0.1 as the address of the DNS server. Additionally it obtains from the DNS server hcws.hcnd.local as its name in the example of FIG. 1.

The home control network device 61 stores the DHCP information it gives to the heat control webserver 63 in its local database.

The home control network key 42 is predetermined to pair up with the home control network device 61. In this way it is possible to establish a direct data transfer connection between the house control intranet 6 and the Ethernet network 3, to which the home control network key 42 is connected.

The home control network key 42 begins the pairing-up process. It notifies the home control network server 21 that it wants to establish a data transfer connection to the home control network device 61 advantageously by using the UDP protocol. The home control network server 21 decides that the requested data transfer connection should be established with the following port numbers:

the home control network key: UDP source port 10500, UDP target port 10501, target IP address 240.1.1.2 the home control network device: UDP source port 10501, UDP target port 10500, target IP address 240.2.1.2

The home control network server 21 reports this information to the home control network key 42 and the home control network device 61.

Thereafter the home control network key 42 sends the UDP packet to the address 240.1.1.2 with source port 10500 to the target port 10501. The sent packet gets through the firewall FW2, which contains a NAT function, because outgoing traffic is not strongly restricted. The FW2 firewall 31 remembers the UDP packet as a connection for the following X seconds with the contact information 10.0.0.2, 240.1.1.2, 10500 and 10501.

The UDP packet arrives at the FW1 firewall 51, which does not allow incoming traffic and it drops the packet. The packet does not arrive at the address 10.0.0.2.

The home control network device 61 sends a UDP packet to address 240.2.1.2 with source port 10501 to target port 10500. The sent UDP packet gets through the FW1 NAT firewall 51, because outgoing traffic is not restricted. The FW1 firewall 51 remembers the UDP packet as a connection for the following X seconds with the contact information 10.0.0.2, 240.2.1.2, 10501 and 10500.

The UDP packet arrives at the FW2 firewall 31. The FW2 firewall 31 remembers that the IP address 10.0.1.2 had established a UDP connection to address 240.1.1.2 with source port 10500 and target port 10501. Because the UDP packet comes from said source address 240.2.1.2, with source port 10501 and to target port 10500, the FW2 firewall 31 interprets the packet as return communication related to the connection established by the device 10.0.1.2. The firewall FW2 thereafter performs an address change operation. It changes the target address of the UDP packet to 10.0.1.2. Thereafter the FW2 firewall 31 routes the UDP packet to address 10.0.1.2. Now the home control network key 42 receives a message from the home control network device 61. A one-way data transfer connection from the home control network device 61 to the home control network key 42 now exists.

Next the home control network key 42 sends a UDP packet to the address 240.1.1.2 with source port 10500 to target port 10501. The UDP packet arrives at the FW1 firewall 51. The FW1 firewall 51 remembers that the address 10.0.0.2 had established a UDP connection to address 240.2.1.2 with source port 10501 and target port 10500. Because the packet comes from source address 240.2.1.2 with source port 10500 and to target port 10501, the FW2 firewall 51 interprets the received UDP packet as return communication to the connection established by the device 10.0.0.2. The FW1 firewall 51 performs an address change, i.e. changes the target address of the packet to 10.0.0.2. Thereafter the FW1 firewall 51 routes the packet to address 10.0.0.2.

Now a two-way UDP connection exists between the home control network key 42 and the home control network device 61. These devices can communicate with each other bidirectionally. The home control network device 61 and the home control network key 42 advantageously form a data link layer level VPN tunnel between them, using for example the OpenVPN software.

The home control network device 61 bridges the created VPN tunnel 55 with the house control remote network 172.17.0.0/24, reference 6, it administrates. In the same way the home control network key 42 bridges the created VPN tunnel 55 with its LAN port, so it is able to provide intranet interfaces in the network 172.17.0.0/24 on the data link layer level. After these operations the house control remote network 4 and the house control intranet 6 form a private VPN network over the Internet 2.

Now a client device 41a can be connected via the Ethernet to the intranet interface of the home control network key 42, which interface can for example be a LAN interface. After the made connection the client device 41a retrieves its IP settings from the home control network device 61 by using the DHCP protocol. The DHCP inquiry sent by the client device 41a or 41c goes to the LAN port of the home control network key 42, which port is bridged with the VPN tunnel 55. The home control network key 42 sends the Ethernet packet formed by the client device 41a or 41c as such to the VPN tunnel 55. The DHCP packet sent by the client device 41a or 41c arrives to the home control network device 61 along the VPN tunnel 55.

The home control network device 61 has a DHCP server, which responds in a return message with IP address 172.17.0.7/24, default router 172.17.0.1 and DNS server 172.17.0.1. The return message of the home control network device 61 correspondingly goes along the VPN tunnel 55 to the home control network key 42, which sends the packet onward to its LAN network interface. Through the LAN network interface the client device 41a or 41c receives the DHCP return packet and takes into use the settings included in the IP return packet. The IP address of the client device is now 172.17.0.7/24, the default router 172.17.0.1, the DNS server 172.17.0.1.

The client device 41a is now logically a part of the VPN network 172.17.0.0/24 and is able to communicate directly on the Ethernet level with device 172.17.0.4 just as if it was directly physically attached to the 172.17.0.0/24 network (house control intranet 6). The technical limitations of the VPN tunnel 55 and Internet connections, such as connection speed and delays, must however be taken into account when communicating.

Devices to be remote-controlled are connected to the LAN interface of the home control network device 61, either permanently or wirelessly. In the examples of FIGS. 1 and 2 the devices to be connected are an air-conditioning control 65, a heat control 63, a surveillance camera 64 and a lighting control 62. The webservers of the devices to be remote-controlled receive their IP address from a DHCP server advantageously comprised in the home control network device.

The home control network device 61 names the IP addresses it gives in a predetermined manner. In the examples of FIGS. 1 and 2 the IP address 172.17.0.4 is "HCND1", which is the heat control. Correspondingly IP address 172.17.0.3 is "HCND2", which is the surveillance camera.

The client device 41 user can now communicate directly on the Ethernet level with the devices 62, 63, 64 and 65 to be remote-controlled presented in FIG. 1. The communication does not differ from the manner which would be used, if the client device 41a was directly physically attached to the house control intranet network 172.17.0.0/24 serving the devices to be remote-controlled.

When utilising the remote control system 1A according to the invention the client device 41a user enters for example http://hcnd1 as an address in the browser. The client device's browser makes a DNS inquiry to the home control network device 61 (from address 172.17.0.1) for the name "HCND1". The home control network device 61 returns to the client device 41a the name with the IP address 172.17.0.4 of HCND1. The user's client device 41a browser advantageously opens with HTTP the page http://HCND1 from the heat control webserver 172.17.0.4. The user now has a direct management connection to the heat control webserver 63 controlling the heat controls.

The client device 41a user can also perform an address search for the primary name "HCND". The home control network device 61 responds to the inquiry with its own IP address 172.17.0.1 and provides an index page to be seen in the user's client device 41a browser. On the index page the user sees in a list form all the resources attached to the LAN interface of the home control network device 61. In the example of FIGS. 1 and 2 the following list is seen in the browser:

| | |
|---|---|
| hcnd1 | 172.17.0.4 |
| hcnd2 | 172.17.0.3 |
| hcnd3 | 172.17.0.2 |
| hcnd4 | 172.17.0.5 |

On the index page it is possible for the client device user to rename the presented objects, e.g. HCND1 with the name "heat control" and HCND2 with the name "surveillance camera". The home control network device automatically stores the name changes for the IP addresses in question. Now the client device 41a user can contact for example the heat control by entering only "heat control" in the browser line.

In connection with FIGS. 1 and 2 an example has been used to show how the client device 41a, 41b or 41c and the device 62-65 to be remote-controlled in the property can be made to exchange information and control commands in the remote control system according to the invention.

In the embodiment according to FIG. 1 the home control network key 42 and home control network device 61 pairs are advantageously determined in connection with manufacturing.

In the embodiment according to FIG. 2 the pairing of the home control network key 42b and the home control network device 61 can be determined either in connection with manufacturing or at the final use target. If the pairing determination is done at the final use target, then the home control network key 42b is in the embodiment according to FIG. 2 temporarily connected to the home control network device 61. The connecting is advantageously implemented either by means of the devices' USB ports or via a wireless radio network.

Via the coupling the home control network key 42b and the home control network device 61 can receive the identification code of its device pair and send its own identification code to its device pair. Thereafter these two devices can establish a data transfer connection only with each other.

The transfer of the home control network key computer program to the user's user terminal 41c is advantageously implemented as follows.

When the home control network key 42b is momentarily attached by its connection to the data processing device 41c, then the computer program contained in the home control network key 42b with its individual identification codes is installed in the user's data processing device 41c, reference 42e. In connection with the installation the data processing device 41c user is asked whether he wants to take into use a protection function of the device and/or program. If it is desired to activate the protection function, then in this case the home control network key installation program requests that the user gives his password either only to the user's data processing device 41c or to the installed program or if desired to both.

The home control network key with its programs, individual identification codes and passwords can if desired also be stored for example on a well-protected internal network server, from where it can when necessary be moved back to a new home control network key (e.g. if the original key device is broken or lost).

In an advantageous embodiment of the invention the program contained in the home control network key 42b with its identification codes can also be stored on several data processing devices 41c, which may thus function in parallel with the first data processing device.

In an advantageous embodiment of the invention the computer program contained in the home control network key 42b may for example also be situated on a server on the Internet, from where it can be retrieved. In this advantageous embodiment the physical home control network key 42b itself may comprise only the identification code needed for identifying the device pair.

Figure 3:
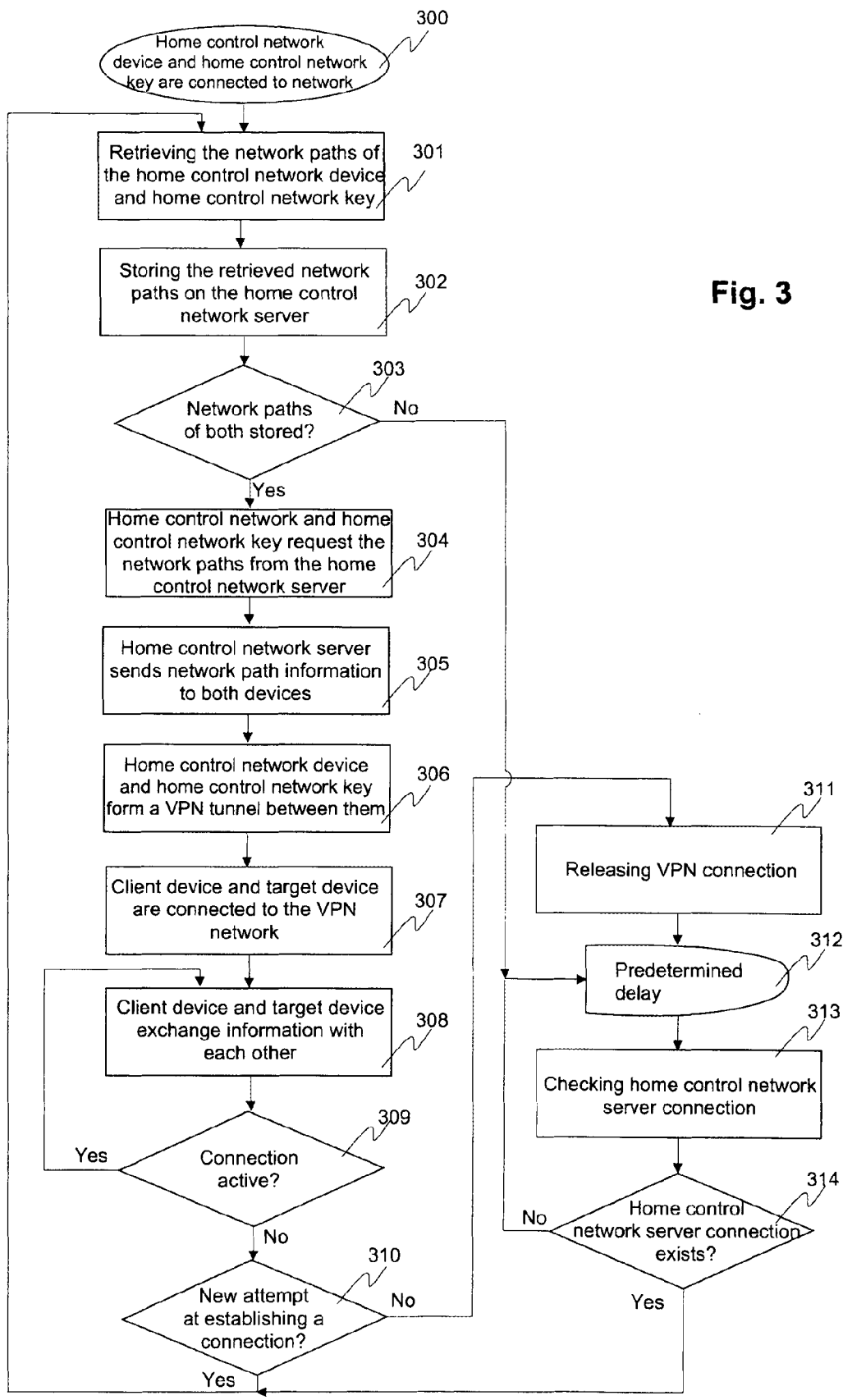
FIG. 3 shows as an exemplary flow chart how the data transfer connection between the client device and the device in the property is established.

FIG. 3 shows as a flow chart the above-described operations after the home control network key 42 or 42b and the home control network device 61 have been paired together.

In step 300 the home control network device 61 is connected to the house intranet network 5 and the home control network key 42 or the data processing device 41c simulating the home control network key to the intranet network 3. All devices to be remote-controlled in the property are connected to the home control network device 61 either with a permanent connection or a wireless connection.

In step 301 both the home control network device 61 and the home control network key 42 or 41c determine their network path. In step 302 both the home control network device 61 and the home control network key 42 stores their determined network paths on the home control network server 21.

In step 303 the devices 42 or 41c and 61 according to the invention to be utilised in the remote-controlling receive information that their device pair has registered with the home control network server 21 or that the registration is missing. If one of the devices 42/41c or 61 according to the invention belonging to the device pair has not registered, then the remote control system 1A or 1B moves after a specified delay 312 to the listening step 313 of the home control network server connection.

At the start of the connection establishing, both the home control network key 42/41c and the home control network device 61 request in step 304 the network path of the counterpart from the home control network server 21. The home control network server 21 checks that it is a question of an allowed device pair, and after the checking it sends the network paths to both devices in step 305. Thereafter the home control network server 21 releases the connection to both devices 42/41c and 61 and thus it is no longer a part of the VPN tunnel 55 being formed.

In step 306 the home control network key 42/41c and the home control network device 61 form a VPN tunnel 55 between them.

In step 307 both the user's client device 41a or 41c and the target device 62-65 in the property are connected to the established VPN network. In the embodiment of FIG. 1 the user's client device 41a is connected to the VPN network by the home control network key 42. In the embodiment of FIG. 2 the user's data processing device 41c itself is one of the end points of the VPN network. The device 62-65 to be remote-controlled in the target is connected to the VPN network by the home control network device 61.

In step 308 the user's client device 41a or 41c and the device 62-65 to be controlled in the property are part of the same VPN network, whereby they may exchange information with each other. After a delay specified in the remote control system, step 309 consists of checking whether the data transfer connection between the client device 41a or 41c and the target device 62-65 is still active. If the data transfer connection is active, the process returns to step 308 and the data transfer is allowed to continue.

If it is in step 309 found that the VPN connection is no longer active, then a decision is made in step 310 regarding a possible new attempt at establishing a connection. If it is decided to make a new attempt at establishing a connection, then the process returns to step 301. In this alternative the process advantageously also includes necessary procedures for releasing the VPN connection, so that the connection establishing process according to the invention itself can be renewed successfully. The connection establishing is attempted according to a predetermined number.

If it is in step 310 decided that a new attempt to establish a VPN connection is no longer made, because a predetermined number of connection establishing attempts have been made or it is for some other reason not desired to establish a VPN connection, then the process moves to step 311. In step 311 the used VPN data transfer network is released.

After the VPN data transfer network is released, a predetermined delay 312 follows in the process utilised in the remote control system 1A or 1B. After the delay 312 the process moves to the listening function 313 of the home control network server. There the current-carrying home control network device 61 sends contact requests via the network to the home control network server 21.

The home control network device 61 repeats the process, step 314, until a network connection to the home control network server 21 is established.

When a data transfer connection to the home control network server 21 is established, then in step 314 a decision is made about moving to a process of establishing a VPN connection, whereby the process returns to step 301.

All the above-described process steps are implemented with program commands, which are performed in a suitable special-purpose or general-purpose processor. The program commands are stored on a storage medium utilised by the home control network device 61 and home control network key 42, such as memories, from which the processor can retrieve and implement them. The references to computer-readable medium can for example also contain special components, such as programmable USB Flash memories, logic arrays (FPLA), application-specific integrated circuits (ASIC) and signal processors (DSP).

Figure 4:
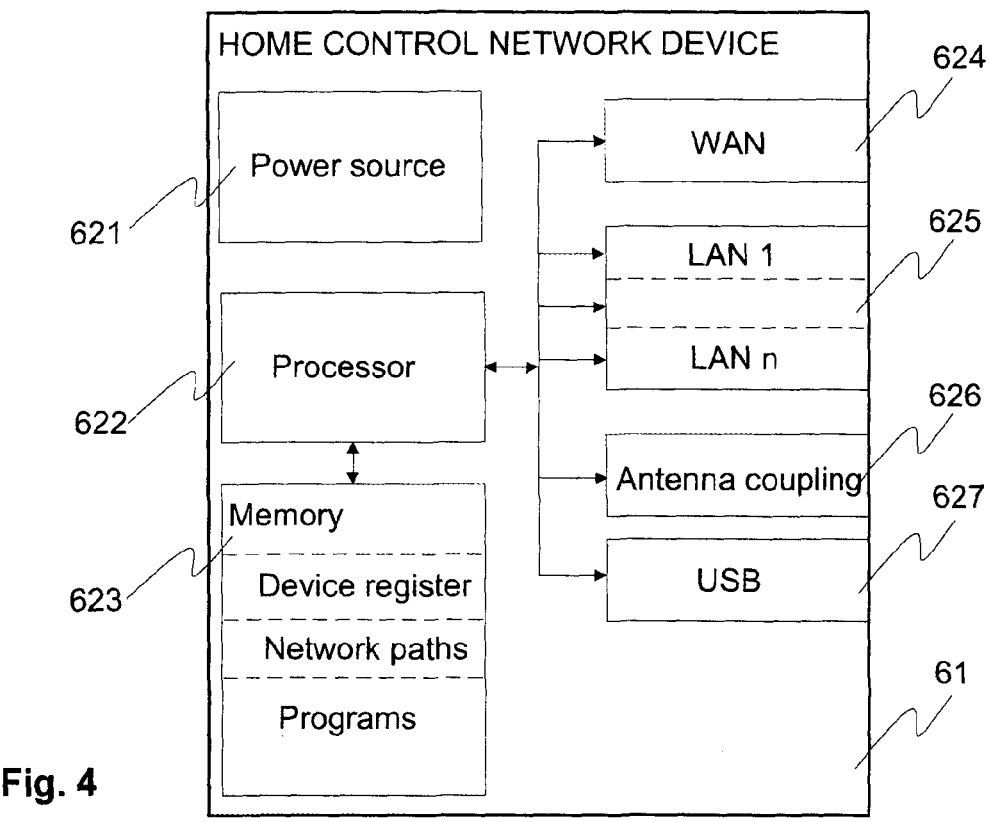
FIG. 4 shows as an example a home control network device according to the invention.

FIG. 4 shows the functional main parts of the home control network device 61 according to the invention. The home control network device 61 has a power source 621. It can be an accumulator or a power source based on mains current. All the electric components of the home control network device get their operating voltage from the power source 621.

The home control network device 61 has one or more processors 622. The processor or processor means can comprise an arithmetic logic unit, a group of different registers and control circuits. A data storing arrangement 623, such as a memory unit or memory means, whereon computer-readable information or programs or user information can be stored, has been connected to the processor means. The memory means 623 typically contain memory units, which allow both reading and writing functions (Random Access Memory, RAM), and memory units containing non-volatile memory, from which data can only be read (Read Only Memory, ROM). The identification information of the device, its current network path, the identification information of the home control network key 42 functioning as its pair and all the programs needed for the operation of the home control network device 61 are advantageously stored in the memory means.

Some examples of programs stored in the memory of the home control network device 61 are an operating system (e.g. Linux), TCP/IP programs, a VPN program (e.g. OpenVPN), a DHCP client device/server program (e.g. ISC DHCP), a DNS server program (e.g. dnsmasq), a database program (e.g. SQLite), a remote control program (e.g. OpenSSH), a certificate management/confirmation program (e.g. GPG) and a user interface library (e.g. LuCI).

The home control network device 61 also comprises interface elements, which comprise an input/output or input/output means 624, 625, 626 and 627 for receiving or sending information. The information received with the input means is transferred to be processed by the processor means 622 of the home control network device 61. The interface elements of the home control network device transfer information either to the data transfer network or to external data processing devices. The interface elements of the home control network device 61 are advantageously a WAN port 624, one or more LAN ports 625, an antenna port 626 and a USB port 627. The pairing of the home control network device 61 and the home control network key 42 or 41c can advantageously be done for example via the USB port 627.

It is obvious to someone skilled in the art that the functions of the home control network device 61 can be integrated as a part of a computerised or house engineering device, which has a sufficient processor and memory capacity and connecting means for connecting various technical means thereto either with a wired data transfer connection or a wireless data transfer connection. This computerised device, in which the functions of the home control network device are integrated, is connected to some data transfer network 5, from which there is access to the public Internet.

Figure 5A:
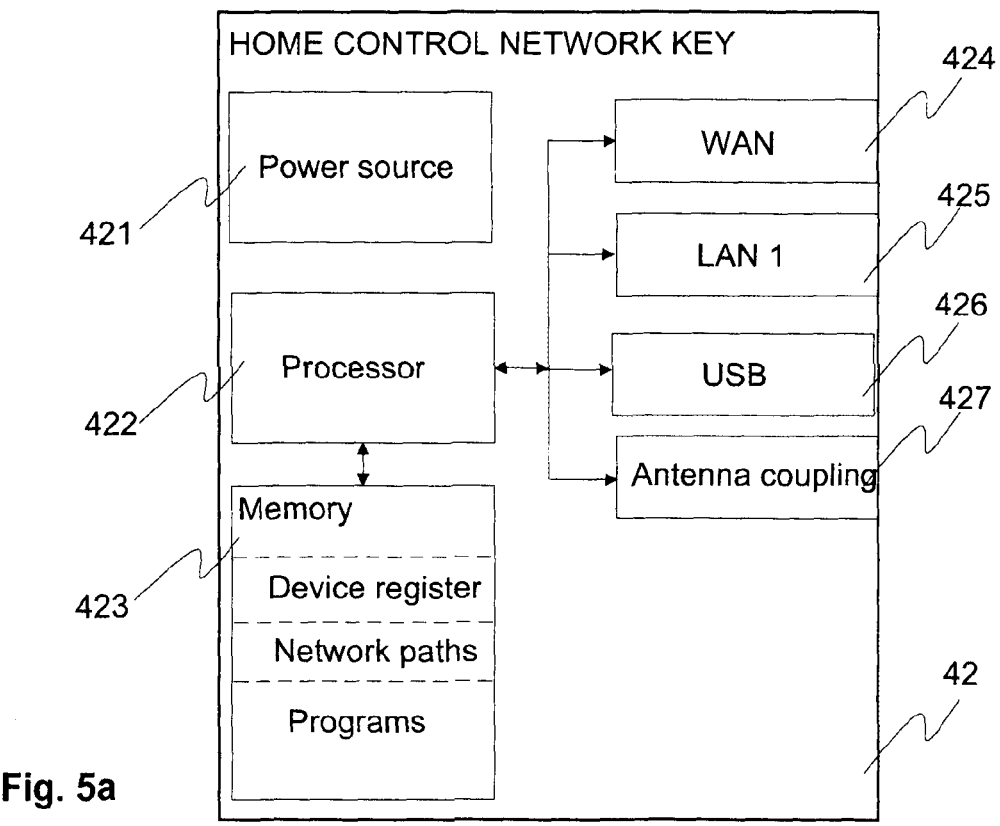
FIG. 5a shows as an example a home control network key according to the invention.

FIG. 5a shows the functional main parts of the home control network key 42 according to the invention. The home control network device 42 has a power source 421. It can be an accumulator or a power source based on mains current. All the electric components of the home control network device get their operating voltage from the power source 421.

The home control network key 42 may comprise one or several processors 422. The processor or processor means can comprise an arithmetic logic unit, a group of different registers and control circuits. A data storing arrangement 423, such as a memory unit or memory means, whereon computer-readable information or programs or user information can be stored, has been connected to the processor means. The memory means 423 typically contain memory units, which allow both reading and writing functions (Random Access Memory, RAM), and memory units containing non-volatile memory, from which data can only be read (Read Only Memory, ROM). The identification information of the device, its current network path, the identification information of the home control network devices functioning as its device pairs and all the programs needed for the operation of the home control network key 42 are advantageously stored in the memory means.

Some examples of programs stored in the memory of the home control network key 42 are an operating system (e.g. Linux), TCP/IP programs, a VPN program (e.g. OpenVPN), a DHCP server/client device program (e.g. ISC DHCP), a DNS server program (e.g. dnsmasq), a database program (e.g. SQLite), a remote control program (e.g. OpenSSH), a certificate management/confirmation program (e.g. GPG) and a user interface library (e.g. LuCI).

The home control network key 42 also comprises interface elements, which comprise an input/output or input/output means 424, 425 and 426 for receiving or sending information. The information received with the input means is transferred to be processed by the processor means 422 of the home control network key 42. The interface elements of the home control network device transfer information either to the data transfer network or to external data processing devices. The interface elements of the home control network device 42 are advantageously a WAN port 424, a LAN port 425, a USB port 426 and an antenna port 427.

Figure 5B:
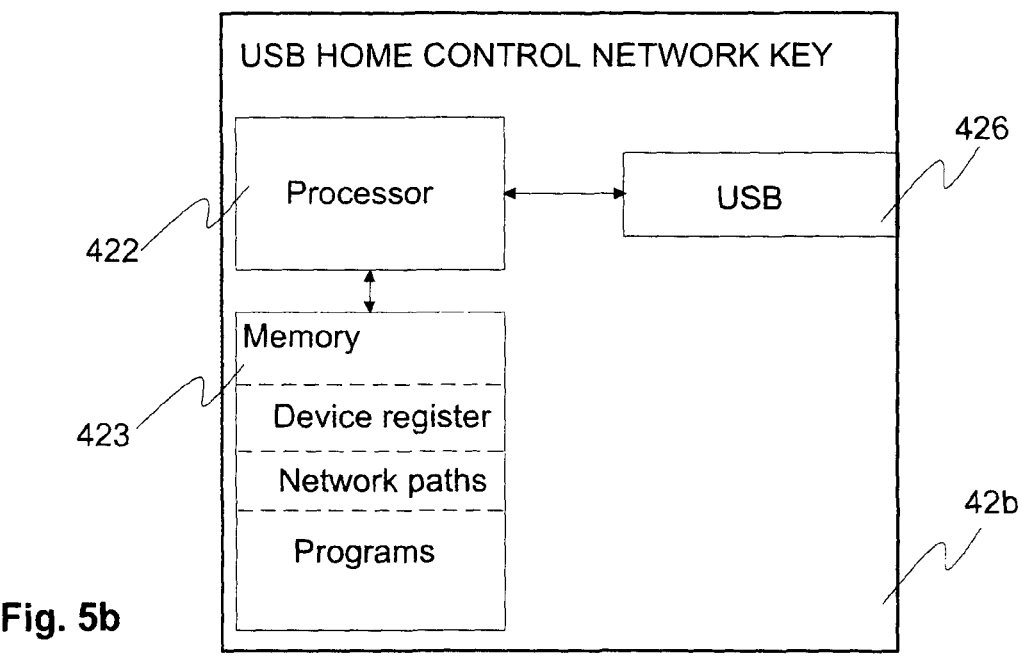
FIG. 5b shows as an example another home control network key according to the invention and FIG. 6 shows as an example a home control network server according to the invention.

FIG. 5b shows the functional main parts of a home control network key 42b according to a second embodiment of the invention. The home control network key 41c according to this embodiment may comprise one or several processors 422. The processor or processor means can comprise an arithmetic logic unit, a group of different registers and control circuits. A data storing arrangement 423, such as a memory unit or memory means, whereon computer-readable information or programs or user information can be stored, has been connected to the processor means. The memory means 423 typically contain memory units, which allow both reading and writing functions (Random Access Memory, RAM), and memory units containing non-volatile memory, from which data can only be read (Read Only Memory, ROM). The identification information of the home control network key 42b, its current network path, the identification information of the home control network device 61 functioning as its device pairs and all the programs needed for the operation of the home control network key 41c are advantageously stored in the memory means.

Some examples of programs stored in the memory of the home control network key 42b are an operating system (e.g. Linux), TCP/IP programs, a VPN program (e.g. OpenVPN), a DHCP client device program (e.g. ISC DHCP), a database program (e.g. SQLite), a certificate management/confirmation program (e.g. GPG) and a user interface library (e.g. LuCI).

The home control network key 42b also comprises interface elements, which comprise an input/output or input/output means 426 for receiving or sending information. The information received with the input means is transferred to be processed by the processor means 422 of the home control network key 42b. The interface elements of the home control network device are advantageously used to transfer information from the memory 423 of the home control network key either to an external data processing device 41c or to the home control network device 61. Correspondingly information or commands can be received via the interface elements for example from the data processing device, to which the home control network key 42b is connected.

With regards to their access right levels there are at least two levels of the above-described home control network keys 42 or 42b, for example administrator and basic user level key devices. A higher access right level key device user/owner (e.g. an administrator) has control right to all control targets of home control network key users on a lower level (such as basic users). An owner of a lower level key device access right level does on the other hand not have access to any other higher access right level control target than his own targets.

Figure 6:
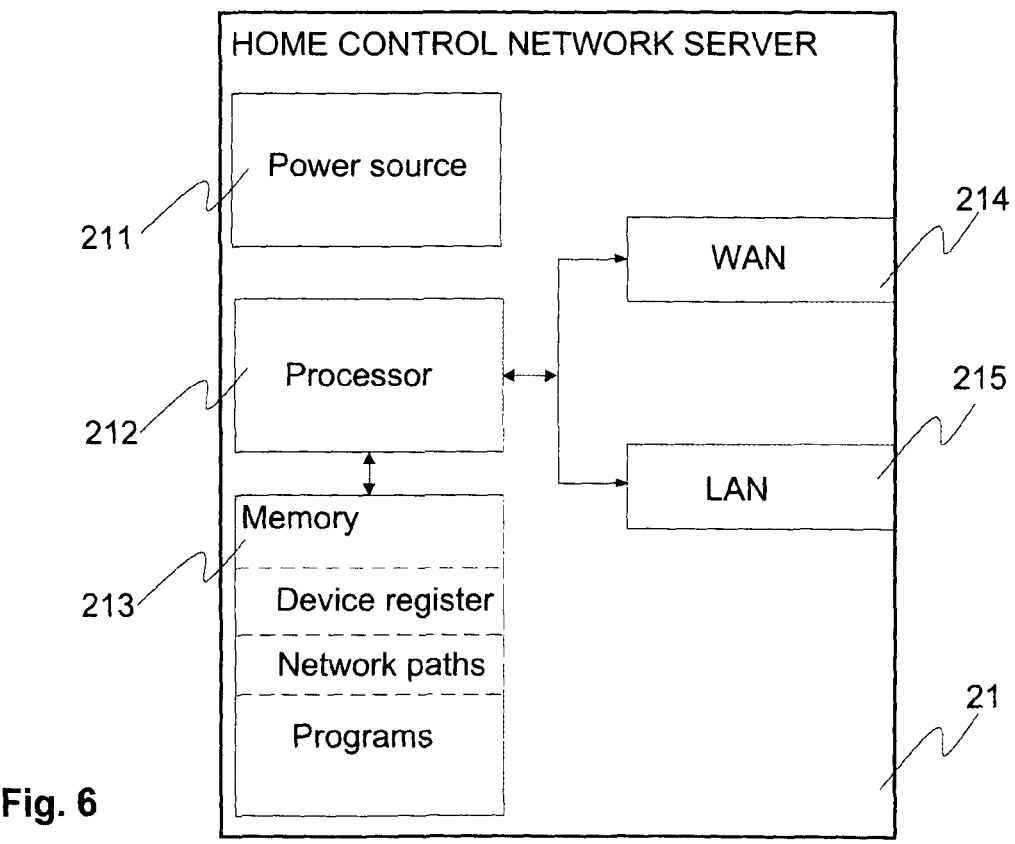

FIG. 6 shows the functional main parts of the home control network server 21. The home control network server 21 comprises a power source 211. It can be an accumulator or a power source based on mains current. All the electric components of the home control network server 21 get their operating voltage from the power source 211.

The home control network server 21 has one or more processors 212. The processor or processor means can comprise an arithmetic logic unit, a group of different registers and control circuits. A data storing arrangement 213, such as a memory unit or memory means, whereon computer-readable information or programs or user information can be stored, has been connected to the processor means. The memory means 213 typically contain memory units, which allow both reading and writing functions (Random Access Memory, RAM), and memory units containing non-volatile memory, from which data can only be read (Read Only Memory, ROM). The identification information of the device pairs in the remote control system, the current network paths of each device pair and all the programs needed for establishing the VPN data transfer connection to be established between the device pairs are advantageously stored in the memory means.

Some examples of programs stored in the memory of the home control network server 21 are an operating system (e.g. Linux), TCP/IP programs, a DHCP server/client device program (e.g. ISC DHCP), a DNS server program (e.g. bind), a database program (e.g. SQLite), a certificate management/confirmation program (e.g. GPG) and a user interface library (e.g. LuCI).

The home control network server 21 also comprises interface elements, which comprise an input/output or input/output means 214 and 215 for receiving or sending information. The information received with the input means is transferred to be processed by the processor means 212 of the home control network server 21. The interface elements of the home control network server 21 transfer information either to the data transfer network or to external data processing devices. The interface elements of the home control network server 21 are advantageously a WAN port 214 and one or more LAN ports 215.

The home control network server 21 advantageously also comprises a user interface (not shown in FIG. 6), which comprises means for receiving information from the server 21 user. The user interface can comprise a keyboard, a touch screen, a microphone and a speaker.

Some advantageous embodiments of the remote control method and remote control system according to the invention have been described above. The invention is not limited to the solutions described above, but the inventive idea can be applied in numerous ways within the scope of the claims.

The invention claimed is:

1. A home control network key for actuators in a property, which comprises:
   network interface elements, which comprise inputs and outputs for network interfaces,
   a processor, and
   a memory having a stored computer program code,
   the processor, the memory and the stored computer program code configured to:
      determine a network path from the home control network key to the Internet,
      store the determined network path both in the memory of the home control network key and in a memory of a home control network server, wherein the processor, the memory and the stored computer program code are further configured to:
  receive a unique device identification code sent by a home control network device, which is a unique terminal device with which the home network control key is only allowed to establish a data transfer connection and send an identification code to the home control network device, when the home control network key and the home control network device are connected together via USB ports,
  request from the home control network server network path information of the home control network device in order to establish an end-to-end data transfer connection to the home control network device,
  receive from the home control network server the network path information of the home control network device, and
  establish with the aid of the received network path information with the home control network device a virtual private network for the remote control of actuators of a property to which the home control network server does not belong.

2. The home control network key according to claim 1, configured to install a computer program implementing home control network key functions from the memory of the home control network key to a data processing device connected to the Internet, which data processing device is configured to simulate the home control network key functions with the installed computer program.

3. The home control network key according to claim 2, configured to also install a password utilized for launching a home control network key simulation into said data processing device.

4. A home control network device for actuators in a property, which comprises:
  network interface elements, which comprise inputs and outputs for both a network interface and devices to be remote-controlled,
  at least one processor, and
  a memory having stored computer program code,
  the processor, the memory and the stored computer program code are configured to:
    determine a network path from the home control network device to the Internet,
    store the determined network path both in the memory of the home control network device and in a memory of a home control network server,
  wherein the processor, the memory and the stored computer program code are further configured to:
    receive a unique device identification code sent by the home control network key, which is a unique terminal device with which the home control network device is only allowed to establish a data transfer connection and send an identification code to the home control network key, when the home control network device and the home control network key are connected together via USB ports,
    request from the home control network server network path information of the home control network key in order to establish an end-to-end data transfer connection to the home control network key,
    receive from the home control network server the network path information of the home control network key, and
    establish with the aid of the received network path information with the home control network key a virtual private network for the remote control of actuators of a property to which the home control network server does not belong.

5. The home control network device according to claim 4, configured to form said virtual private network either in an OSI model data link layer (Layer 2) or an network layer (Layer 3).

6. A computer program product comprising computer program code stored on a non-transitory computer-readable storage for providing home control network key functions comprising:
  code for determining a network path from an home control network key to the Internet;
  code for storing the determined network path both in a memory of the home control network key and in a memory of a home control network server, wherein the computer program further comprises:
  code for receiving a unique device identification code sent by a home control network device, which is a unique terminal device with which the home control network key is only allowed to establish a data transfer connection and send an identification code to the home control network device, when a home control network key and a home control network device pair are connected together via USB ports;
  code for requesting from the home control network server the network path information of the home control network device in order to establish an end-to-end data transfer connection to the home control network device,
  code for receiving the network path information of the home control network device from the home control network server, and
  code for establishing a virtual private network based on the received network path information with the home control network device for remote control of actuators in the property to which the home control network server does not belong.

7. The computer program product according to claim 6, including code configured to install a computer program implementing home control network key functions from the memory of the home control network key to a data processing device connected to the Internet, so that the functions of the home control network key can be simulated with the data processing device.

8. The computer program product according to claim 7, including code configured to install a password utilised for launching a home control network key simulation from the home control network key into the data processing device.

9. A computer program product comprising computer program code stored on a non-transitory computer-readable storage for providing home control network device functions comprising:
  code for determining a network path from a home control network device to the Internet,
  code for storing the determined network path both in a memory of the home control network device and in a memory of a home control network server wherein the computer program further comprises:
  code for receiving a unique device identification code sent by a home control network key, which is a unique terminal device with which the home control network device is only allowed to establish a data transfer connection and send an device identification code to the home control network key, when the home control network device and the home control network key are connected together via USB ports;

code for requesting from the home control network server the network path information of the home control network key in order to establish an end-to-end data transfer connection to the home control network key;

code for receiving the network path information of the home control network key from the home control network server; and code for establishing a virtual private network based on the received network path information with the home control network key for remote control of the actuators in the property to which the home control network server does not belong.

\* \* \* \* \*